(12) United States Patent
Hartmann et al.

(10) Patent No.: US 7,878,490 B2
(45) Date of Patent: Feb. 1, 2011

(54) DAMPING ARRANGEMENT FOR LAWN AND GARDEN CARE IMPLEMENT

(75) Inventors: Dietmar Hartmann, Wiehl (DE); Wolfgang Nowack, Wiehl (DE); Franz Joseph, Engelskirchen (DE)

(73) Assignee: Deere & Company, One John Deere Place, Moline, IL (US)

( * ) Notice: Subject to any disclaimer, the term of this patent is extended or adjusted under 35 U.S.C. 154(b) by 134 days.

(21) Appl. No.: 11/454,775

(22) Filed: Jun. 16, 2006

(65) Prior Publication Data

US 2007/0018369 A1 Jan. 25, 2007

(30) Foreign Application Priority Data

Jul. 19, 2005 (DE) .................. 10 2005 033 596
Jan. 19, 2006 (EP) .................. 06100557

(51) Int. Cl.
*F16F 1/00* (2006.01)
(52) U.S. Cl. .................. 267/145; 267/140.12; 188/378
(58) Field of Classification Search .............. 267/293, 267/140.12
See application file for complete search history.

(56) References Cited

U.S. PATENT DOCUMENTS

| | | | | |
|---|---|---|---|---|
| 4,015,407 A | * | 4/1977 | Bacon | 56/255 |
| 4,312,421 A | * | 1/1982 | Pioch | 181/202 |
| 4,422,283 A | * | 12/1983 | Scanland | 56/320.2 |
| 4,609,055 A | * | 9/1986 | Grafstrom et al. | 173/162.2 |
| 4,825,548 A | * | 5/1989 | Driggers | 30/276 |
| 5,692,306 A | * | 12/1997 | Stoll et al. | 30/276 |
| 6,725,985 B2 | * | 4/2004 | Haneishi et al. | 188/379 |
| 7,070,009 B2 | * | 7/2006 | Kawamoto et al. | 173/211 |
| 2004/0232607 A1 | * | 11/2004 | Bodin et al. | 267/140.12 |
| 2005/0179178 A1 | * | 8/2005 | Cropelli | 267/137 |
| 2005/0269754 A1 | * | 12/2005 | Fujii et al. | 267/140.12 |
| 2005/0279598 A1 | * | 12/2005 | McPherson | 188/378 |
| 2007/0018367 A1 | * | 1/2007 | Kamei | 267/140.12 |

FOREIGN PATENT DOCUMENTS

| | | | |
|---|---|---|---|
| DE | 3145337 A1 | * | 5/1983 |
| DE | 35 03 938 A1 | | 8/1986 |
| DE | 92 16 981 | | 3/1993 |
| DE | 195 02 171 | | 8/1996 |
| DE | 102 61 756 | | 7/2004 |
| EP | 0 081 079 | | 6/1983 |
| EP | 0 128 128 | | 12/1984 |
| FR | 2673588 A1 | * | 9/1992 |
| GB | 494 811 | | 11/1938 |
| WO | WO 2004/086850 | | 10/2004 |
| WO | WO 2004107845 A1 | * | 12/2004 |

OTHER PUBLICATIONS

European Search Report dated Dec. 1, 2006 (9 pages).

* cited by examiner

*Primary Examiner*—Bradley T King
*Assistant Examiner*—James K Hsiao

(57) ABSTRACT

An implement for lawn and garden care includes a housing, a drive, and a handle attached to the housing with a vibration damping arrangement. The damping arrangement includes an at least partially elastic damping element. The stiffness of the damping element is determined by its cross section that includes at least one cavity or recess.

18 Claims, 5 Drawing Sheets

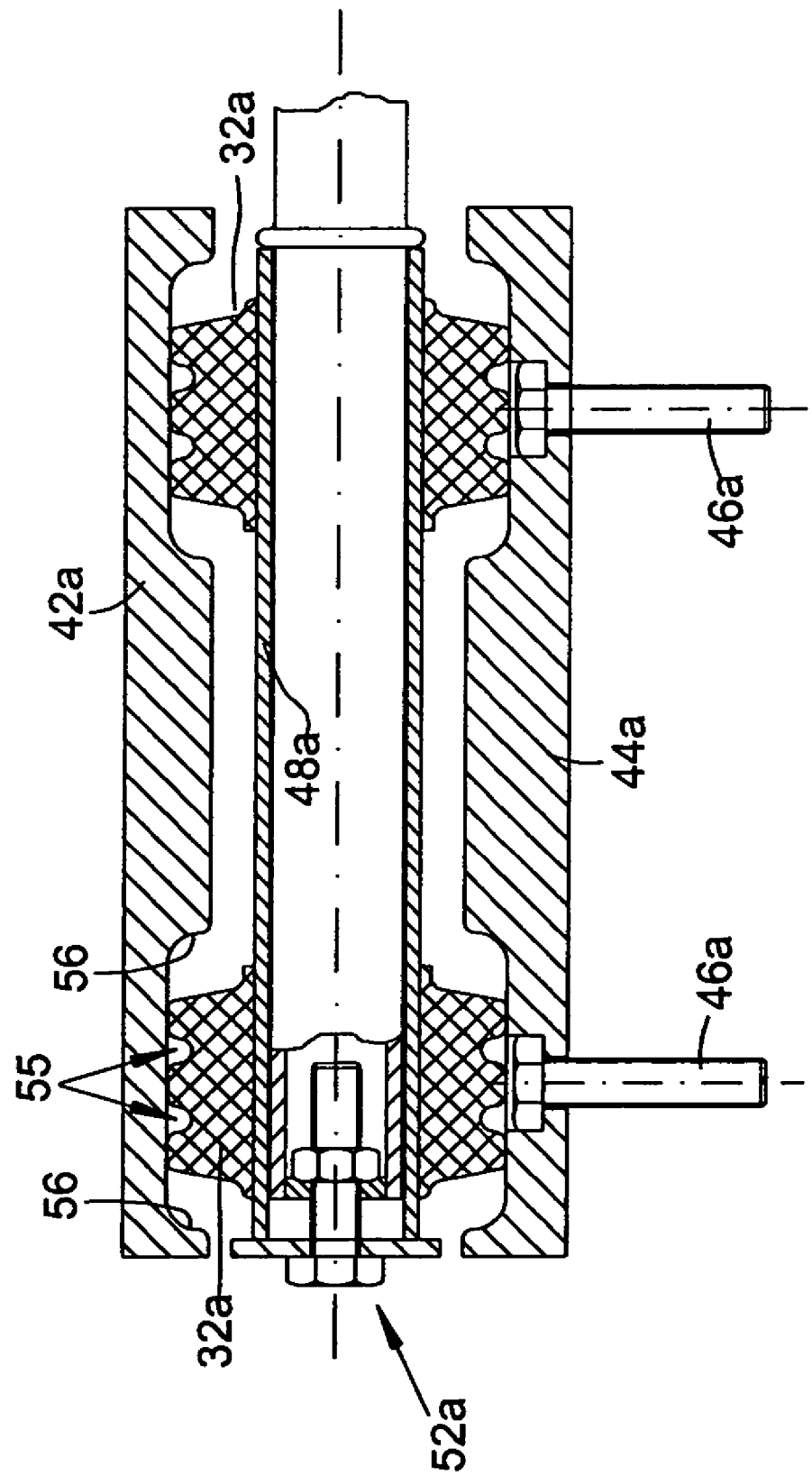

DAMPING ARRANGEMENT FOR LAWN AND GARDEN CARE IMPLEMENT

FIELD OF THE INVENTION

The invention concerns an implement for lawn and garden care with a handle, a housing and a drive. More specifically, the invention concerns a damping arrangement for the handle of a manually guided or manually pushed lawn and garden care implement.

BACKGROUND OF THE INVENTION

Manually guided as well as manually pushed lawn mowers or other lawn and garden care implements are frequently provided with a handle that is arranged on the implement in the rear region of the housing. Such handles may be provided as movable components so that, when not in use or during transportation, they can be brought into a position in which the lawn mower or other implement requires less space.

DE-A-35 03 398 shows an elastic bearing arrangement of handgrips of handles for motorized implements guided by two hands. An elastic handgrip handle bearing arrangement is provided that utilizes two axes extending at right angles to each other and is configured by means of four rubber bearings.

A problem is seen in the fact that known manually guided motorized mowing or lawn and garden care implements cause vibrations, and known damping arrangements for their handles require a large number of components.

SUMMARY OF THE INVENTION

The invention provides a damping arrangement for the handle of a manually guided lawn mower or lawn and garden care implement that requires a small number of components. The damping arrangement includes one or more damping elements, with each damping element having cavities or recesses.

The damping arrangement of the invention may be provided with several, preferably two, damping elements, which can simplify the assembly or mounting. The arrangement of the damping elements can favorably affect the damping performance, because the damping elements can be arranged in varying regions and/or be provided with varying damping characteristics or stiffness.

The damping elements may include cavities or recesses that may be shaped variously or may vary in size. A particularly uniform stiffness across the cross section results if at least two of the cavities or recesses are dimensioned or shaped identically. For this purpose the invention may provide cavities or recesses of equal shape and/or equal dimension that are arranged or grouped alternately.

The damping arrangement of the invention may include damping elements with cavities or recesses that are spaced around the circumference and/or spaced radially. The cavities can be configured in a simple way as circumferential slots or grooves.

The invention may include ribs between the cavities or recesses of the damping elements, and the ribs can separate the cavities or recesses from one another. Alternatively, bridges etc. may be provided in the damping elements. The ribs are preferably components of the damping element and, for example, form it in part. Or reinforcing ribs or struts may be incorporated into the damping element. The ribs can be configured or be dimensioned uniformly or they can vary, in particular they may vary in their width or be uniformly wide.

The damping arrangement of the invention may connect the handle directly with the implement or a housing of the implement. Preferably the handle is provided with at least a first handle part and at least a second handle part, where the damping arrangement connects the two handle parts directly or indirectly to each other. Such an arrangement is simple to manufacture and maintain, and can be provided for the customer's selection or as retrofit for an implement of this kind.

The damping arrangement may include a housing that is arranged to accept a damping element. Such a housing is particularly appropriate to enclose the damping element so that it is interchangeable or helps attach the damping arrangement to the implement or to a component of the implement.

It is particularly advantageous if the damping arrangement and/or the housing engages at least one of the handle parts or interacts with one of the handle parts. For this purpose the housing and/or the damping element may, for example, be connected rigidly, for example, bolted, welded, clamped etc. so that it can be removed from the one handle part.

If the damping element is provided with an at least generally cylindrical contour, then it is simple to manufacture and occupies little space. Additionally, a damping element may be configured so that it can be assembled, or removed if necessary, very easily into a damping element housing, particularly a damping element housing configured as a collar.

In order to connect the damping element in a simple way with the handle part, for example, by clamping, pressing or shrinking, the cross section can be provided with at least one recess in order to engage at least one of the handle parts.

The damping element may consist entirely, generally, or at least in some parts of a plastic or a rubber-like material. Additionally, inserts, ribs etc. may be provided, for example, as reinforcement, or even an internal or external sleeve or the like, of other material or even non-elastic materials.

The cross section of the damping element may be symmetrical, particularly relative to the longitudinal axis of the damping element or relative to at least one handle part. Such a configuration is particularly simple to manufacture and is provided with uniform properties. In order to meet expected future requirements the cross section may be uniform or variable along the longitudinal axis or along the handle part. For example, the cavity or the cavities may extend through the entire damping element, they may also be distributed section by section uniformly or non-uniformly or in any other appropriate manner.

Additionally, the implement may be provided with an overload protection in order to protect the damping element against damage. The damping element may, for example, be secured in the damping arrangement housing in such a way that when demands differing from the normal operating conditions are encountered, for example, if the implement is lifted with the handle and as a result increased loads are applied to the damping arrangement, an additional protection is provided by the overload protection device. During normal operation the damping element can be retained in the damping arrangement housing, for example, by a friction lock connection. Then a transmission of force by means of the securing element can occur during which forces exceeding the capacity of the friction lock connection are encountered. For this purpose the securing element can, for example, be engaged in a loose fit in the damping arrangement housing. An overload protection of this kind can also be applied in connection with damping arrangements or damping elements that differ from the damping arrangement described in the present patent application and therefore represents an independent invention.

The implement may be a self-propelled or a manually guided implement, for example, a de-thatcher, a sweeper, a motorized rake or any other motor-driven implement or an implement provided with a motor preferably in the form of an implement for lawn and garden care, in particular a lawn mower.

Such a damping arrangement could be applied as a retrofit to an appropriate implement, in particular an implement for lawn and garden care, but particularly to lawn mowers, in order to reduce the transmission of vibrations.

By replacing or exchanging the damping element for a damping element of different stiffness, differing demands on the damping arrangement or the implement can be met. Such a damping element can also be provided as replacement part.

BRIEF DESCRIPTION OF THE DRAWINGS

Several embodiments of the invention are described in greater detail in the following drawings.

FIG. 5 shows a cross section through an further alternate damping arrangement in a third embodiment of the invention.

DESCRIPTION OF THE PREFERRED EMBODIMENT

Figure 1:
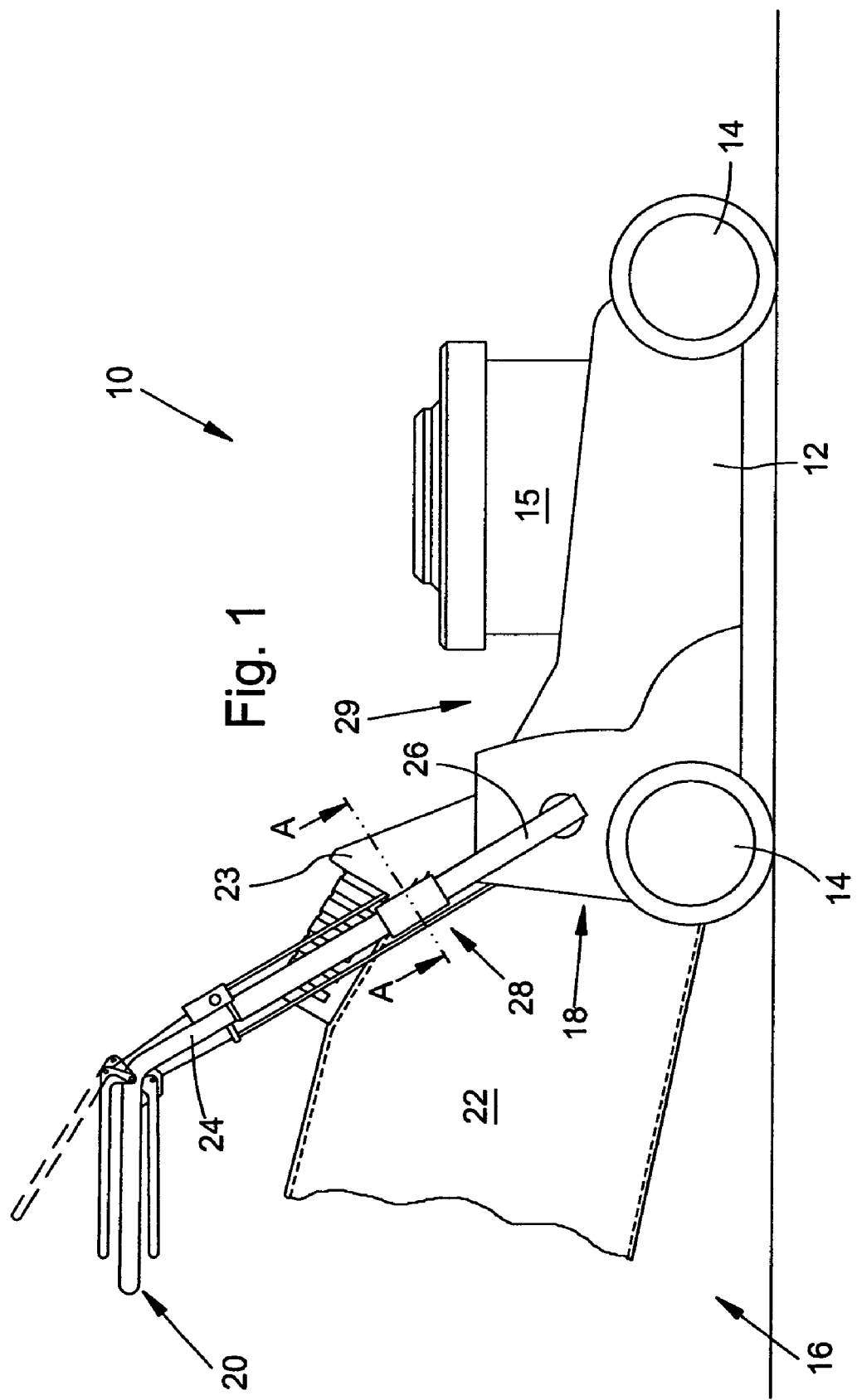
FIG. 1 shows a side view of a lawn and garden care implement with a handle and a damping arrangement in one embodiment of the invention.

At first reference is made to FIG. 1 that shows a lawn and garden care implement 10 in the form of a manually guided or manually propelled lawn mower in an operating position. The lawn mower is provided with a housing 12 that is supported on the ground by two front wheels and two rear wheels 14. A drive 15 that is only indicated, for example, in the form of an internal combustion engine or electric drive is provided on the housing 12, in order to bring one or more mowing blades or operating units arranged underneath the housing into rotation. The operating units may, for example, be in the form of rotating blades or cutting reels that cut grass or vegetation. The housing 12 is provided with an ejection opening 18 in its rear region 16 relative to the usual operating direction of the implement 10, the ejection opening permitting clippings to leave the housing 12.

A handle 20 as well as a cover flap 23 are attached to the rear region 16 of the housing 12. As shown in FIG. 1, a collection container 22 is provided, so that it can be removed, adjacent to the rear region 16. The collection container is provided on the vehicle 10 or its housing 12, so that the clippings ejected through the ejection opening 18 can be collected in the collection container and later dumped in a garbage receptacle or used for composting.

The handle 20 is provided with a first, upper handle part 24 and a second, lower handle part 26. The two handle parts 24, 26 are connected to each other by damping arrangement 28, that shall be described in greater detail in the following paragraphs.

Figure 2:
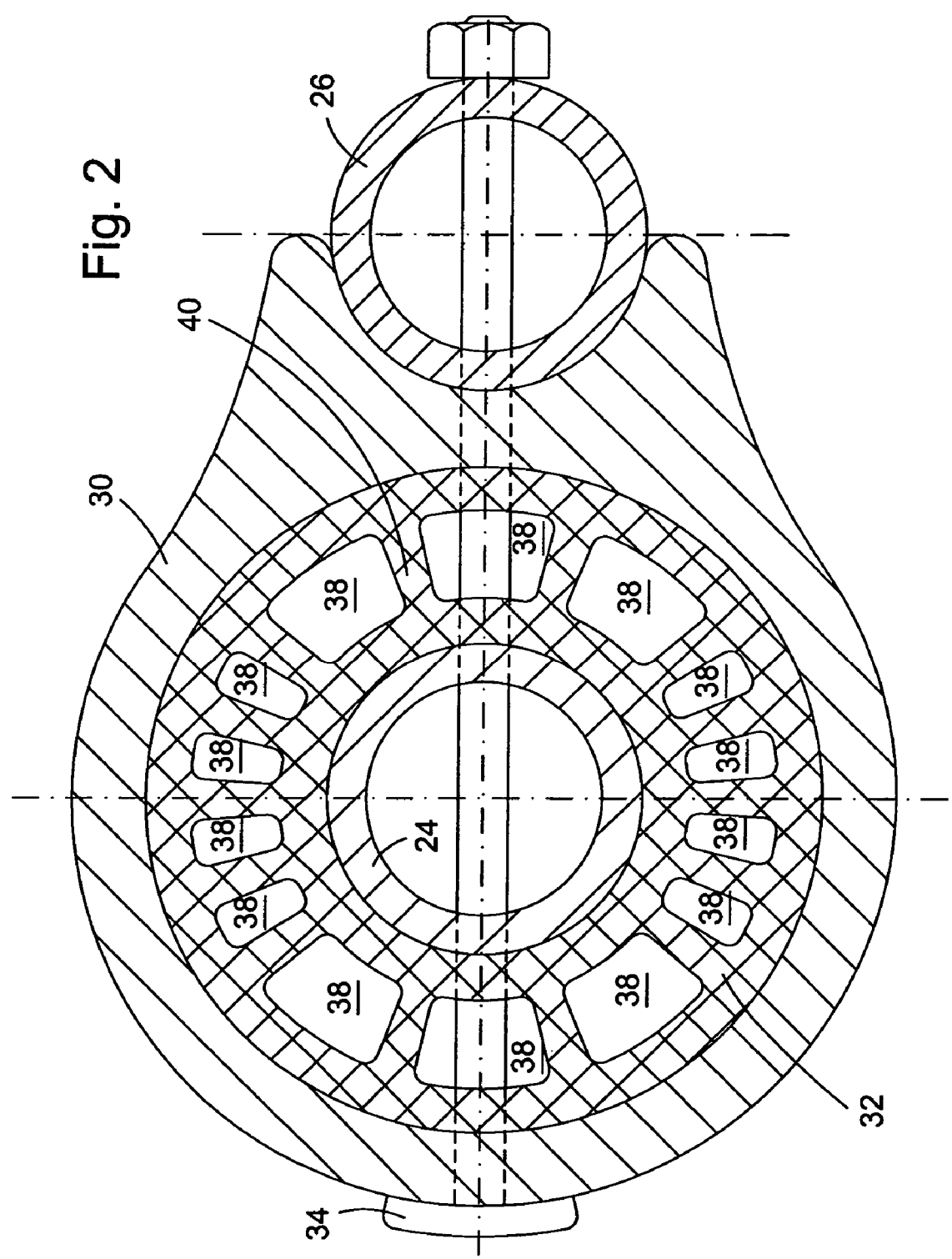
FIG. 2 shows a cross section through the damping arrangement of FIG. 1 provided at the handle in one embodiment of the invention.

Reference shall now be made to FIG. 2 which shows a cross section through the damping arrangement 28 and the two handle parts 24, 26. The damping arrangement 28 is provided with a damping arrangement housing 30 and a damping element 32. The damping arrangement housing 30 is configured in the form of a collar that can enclose the damping element 32 and consists, for example, of an aluminum or zinc die casting.

The damping element 32 is arranged in an inner ring-shaped region of the collar-shaped damping arrangement housing 30 and is, for example, pressed into it or shrunk into and retained by the housing, or vulcanized into it. An additional safety arrangement may be provided for the damping element 32 in the damping arrangement housing 30, or the damping element 32 can be retained in the damping element housing 30 by one or more stops arranged on both sides of the damping element housing 30. Depending on the application these stops can be connected to the damping element housing 30 rigidly or so that they can be removed. It is also conceivable that one or more stops is or are formed onto the damping arrangement housing 30.

Additionally, in one embodiment, the damping element 32 and damping arrangement housing 30 may be secured to the upper and lower handle parts by a securing element 34. According to the present embodiment, the securing element 34 is configured as a screw secured by a nut which penetrates the damping arrangement housing 30 and the damping element 32. Alternatively, the damping element 32 and the first handle part 24 may be secured in the damping arrangement housing 30 by a securing element configured in the form of a pin and arranged according to the first embodiment. Such a pin could, for example, be inserted into the damping element 32 and retained in a friction lock and secured by cotter pins or in other appropriate manner. The damping arrangement housing 30 can then be rigidly connected to the second handle part 26 by bolting or welding or in any other appropriate manner.

The securing element 34 can also operate in the form of an overload protection device that secures the damping element 32 in the damping arrangement housing 30, for example, only when requirements differing from normal operating conditions are applied to the damping arrangement 38. This may be the case, for example, when the implement 10 is raised at the handle 20 and correspondingly increased loads are applied to the damping arrangement 28. During normal operating conditions the damping element 32 can be retained in the damping arrangement housing 30, for example, by a friction lock connection. A transmission of force by the securing element 34 occurs only in the cases that forces are applied that exceed the friction forces of the friction lock connection. For this purpose the securing element 34 can engage the damping arrangement housing 32, for example, in a loose fit. Such an overload safety device can also be applied in connection with the damping arrangement 28 or the damping element 32 described in the present patent application.

The damping element 32 is formed at least generally by an elastic body 36 that is provided with a multitude of cavities 38. According to the present embodiment these cavities 38 vary in their size and are generally symmetrical and spaced uniformly or separated by generally equally large bridges or ribs 40. Alternatively, the invention includes a non-symmetrical distribution of cavities, equally sized cavities 38 and/or cavities of varying shapes. The cavities 38 may be spaced at various intervals and separated by ribs 40 of varying widths or various shapes, or spaced irregularly or offset to the inside or the outside. The cavities 38 can penetrate the body 36 in the longitudinal direction or in the direction of the length of the handle 20 completely or only partially and provided with intermediate bridges, all encompassing etc. or in any appropriate manner. As stated generally the cavities 34 define an inner contour of the body 36. According to the present embodiment the elastic body 36 is configured as a rubber or plastic element.

Figure 3:
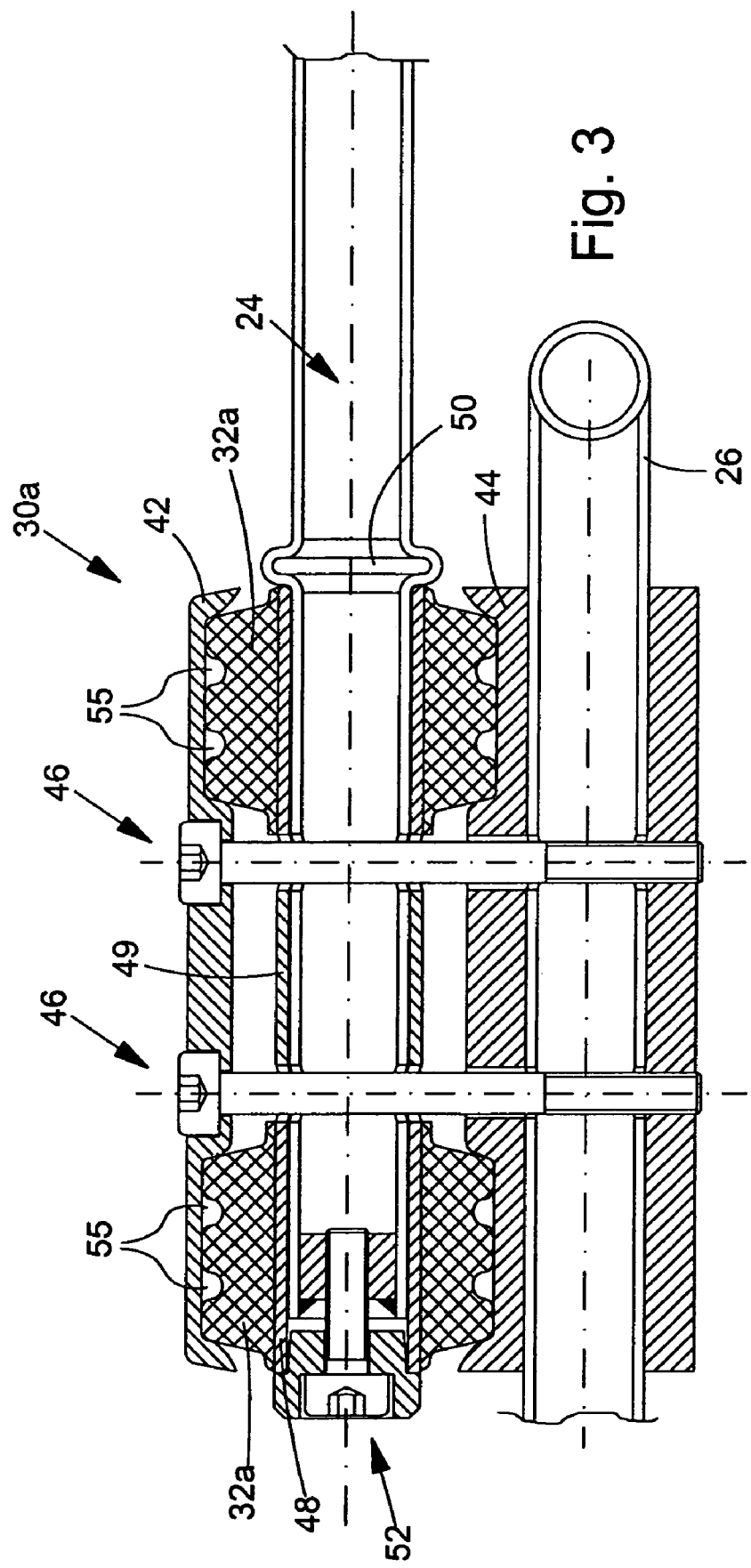
FIG. 3 shows a cross section of an alternate damping arrangement in a second embodiment of the invention.

Reference will now be made to FIG. 3, that shows a further embodiment of the present invention. FIG. 3 shows an alternate damping arrangement 28a with an alternate damping arrangement housing 30a and an alternate damping element 32a. The damping arrangement housing 30a is formed by two shell elements 42, 44, where one shell element 44 is configured in such a way that it is arranged so as to engage the lower handle part 26.

The shell elements 42, 44 enclose the damping element 32a at least so far that it can be retained safely between them. According to the present embodiment, two securing devices 46 in the form of screws are provided so as to secure the damping arrangement 28a with respect to the lower and the upper handle parts 24, 26.

Two damping elements 32a are provided each of which includes a sleeve 48 and an elastic body 36a. The sleeve 48 is pressed into or shrunk onto the elastic body 36a. The damping element 32a can also be vulcanized onto the sleeve 48. The sleeve 48 is applied to the upper handle part 24 in such a way that a spacer 49 in the form of a further sleeve is arranged between them which is in contact with each of the sleeves 48. In the assembled condition one of the sleeves 48 is in contact with a stop 50 at the upper handle part 24. An appropriate screw connection 52 is provided that engages the other sleeve 48 in order to secure the sleeves 48 and the spacer 49 axially on the upper handle part 24.

The securing devices 46 extend through recesses 54 in the spacer 49 and the upper handle part 24, that are dimensioned in such a way that they can be used as an axial stop relative to a movement of the lower handle part 26 with respect to the upper handle part 24, but do not affect the operation of the damping element 32a in normal operation.

Figure 4:
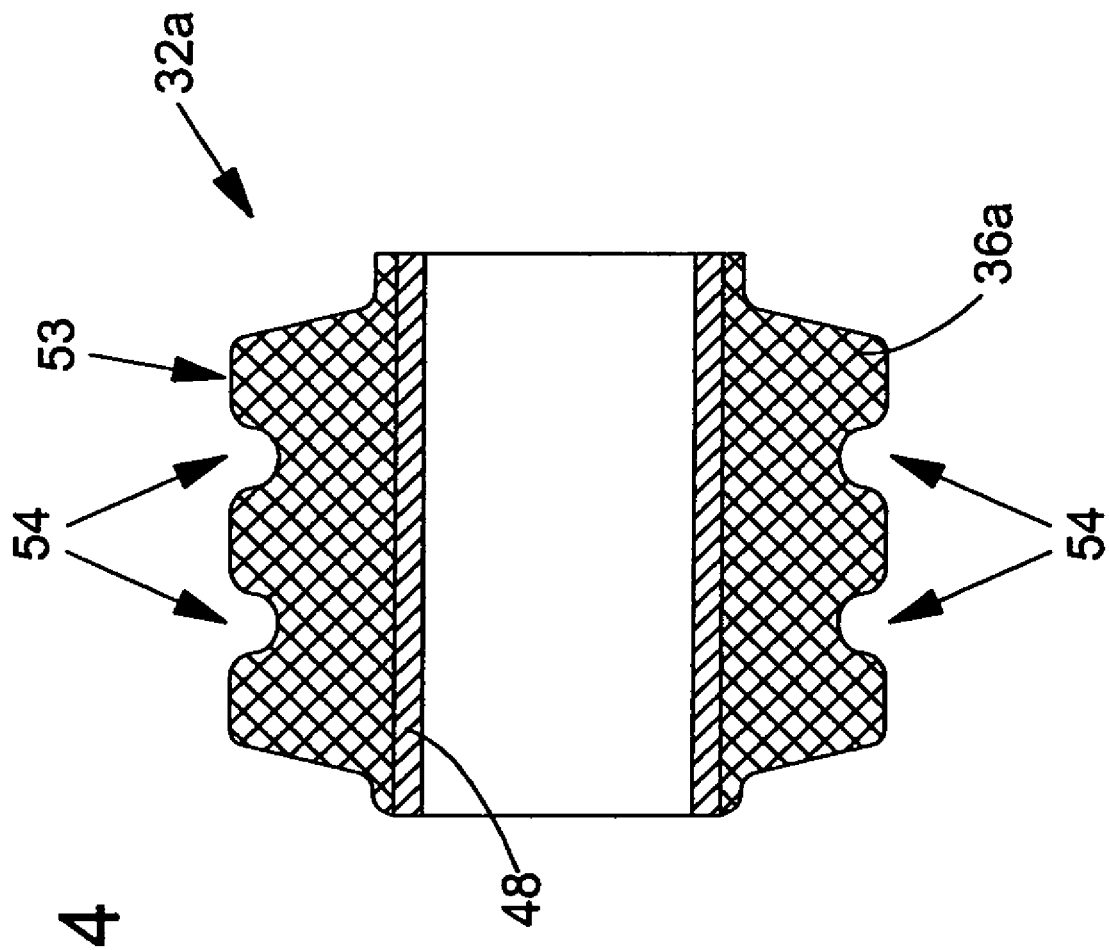
FIG. 4 shows an enlarged view of a damping element of the damping arrangement in a second embodiment according to FIG. 3.

Reference will now be made to FIG. 4 which shows the damping element 32a with its elastic body 36a and the sleeve 48 arranged in the body 36a. The body 36a is generally configured in the form of a cylinder, where the outer surface of the cylinder is provided with recesses 54 in the area of its outer circumferential surface 53, and the recesses are configured in the shape of circumferential slots. The recesses define cavities 55 in interaction with the shell elements 42 or generally an outer contour of the body 36a together with the outer circumferential surface 52.

FIG. 5 shows a further embodiment of a damping arrangement 28b according to the invention that is configured similarly to the damping arrangement 28a of the second embodiment. Therefore in the following corresponding components are identified with the same reference numbers.

The damping arrangement 28b is provided with two damping elements 32a. The damping arrangement housing 30a is formed by two shell elements 42a, 44a that correspond generally to those of FIG. 3. One of the shell elements 44a is secured to the lower handle part 26 by means of securing devices 46a in the form of screws. The two shell elements 42a, 44a in turn are either clamped by a further screw connection or are connected to each other in any other appropriate manner, so that they are able to engage the damping elements 32a. The shell elements 42a, 44a are provided with stops 56 that limit the axial movement of the damping elements 32a with respect to the shell elements 42a, 44a.

The damping elements 32a are applied to a common sleeve 48a, for example, pressed on, shrunk on or vulcanized onto it and are secured to the upper handle part 24 by means of an appropriate screw connection 52a corresponding to the second embodiment. The elastic body 36a of the alternative embodiment is also configured as a rubber or plastic element.

Having described the preferred embodiment, it will become apparent that various modifications can be made without departing from the scope of the invention as defined in the accompanying claims.

The invention claimed is:

1. A damping arrangement for a handle of a walk behind mower, comprising:
    a pair of at least partially elastic damping elements, each element having a stiffness based on its cross section and containing at least one peripheral cavity;
    a handle having a first lower part attached to the walk behind mower and a second upper part generally parallel to and partially alongside the lower part and attached to the lower part by a collar-shaped housing enclosing the pair of damping elements with the peripheral cavities including slots that space circumferential portions of the elastic damping element from the housing, the housing positioned around and spaced from the first part of the handle and secured with a securing device that penetrates the housing and the damping element.

2. The damping arrangement of claim 1 wherein each damping element is a one-piece component that is at least generally closed around its circumference.

3. The damping arrangement of claim 1 further comprising a plurality of damping elements, each damping element enclosed in the housing around a first part of the handle.

4. The damping arrangement of claim 1 wherein each damping element has a sleeve extending therethrough.

5. The damping arrangement of claim 4 wherein the sleeve fits around the first part of the handle.

6. The damping arrangement of claim 1 wherein the securing device is around the pair of damping elements.

7. The damping arrangement of claim 1 wherein the cavities are spaced around the outer periphery of each damping element in the form of circumferential slots.

8. The damping arrangement of claim 1 further comprising ribs on each damping element.

9. The damping arrangement of claim 8 wherein a plurality of the ribs are configured and dimensioned identically.

10. The damping arrangement of claim 1 wherein the damping arrangement housing engages one of the handle parts.

11. The damping arrangement of claim 1 wherein each damping element has an at least generally cylindrical contour.

12. The damping arrangement of claim 1 wherein the cavity has a cross section that engages at least one of the handle parts.

13. The damping arrangement of claim 1 wherein each damping element consists at least partially of a plastic or rubber material.

14. The damping arrangement of claim 1 wherein each damping element has a cross section and a longitudinal axis, and is configured symmetrically with respect to the longitudinal axis.

15. The damping arrangement of claim 1 further comprising an overload safety arrangement that protects each damping element from damage.

16. A damping arrangement between an upper part and a lower part of a handle of a walk behind mower, comprising:
    the first lower part attached to the walk behind mower and the second upper part being generally parallel to the first lower part and attached to the lower part with only a pair of damping elements;

the pair of damping elements completely enclosed inside a housing having a pair of shell elements, one of the shell elements engaging the lower part of the handle;

each damping element having a plurality of peripheral recesses clamped against the shell elements with circumferential slots in the damping element separating parts of the damping element from the shell elements; and securing elements penetrating the housing enclosing the pair of elastic damping elements to secure a portion of the upper part alongside the lower part.

17. The damping arrangement of claim 16 wherein the damping arrangement is the only connection between the upper part and lower part of the handle.

18. A damping arrangement for the handle of a walk behind mower with a housing and a drive on the housing, comprising:

a two part handle including a first lower part attached to the walk behind mower and a second upper part generally parallel to the first lower part;

a collar-shaped damping arrangement housing attached between the upper and lower parts of the handle so that the upper and lower parts of the handle are at least partially alongside each other;

a pair of one-piece elastic damping elements enclosed in the housing and each damping element having at least one peripheral recess around a circumferential portion of the damping element to provide a gap between the elastic damping element and the housing;

a sleeve in the one-piece damping element and applied around one part of the handle; and a securing element extending through the damping arrangement, the first lower part of the handle, again through the damping arrangement, and then through the second upper part of the handle.

* * * * *